United States Patent
Williams et al.

(10) Patent No.: US 9,868,542 B2
(45) Date of Patent: Jan. 16, 2018

(54) TILTROTOR AIRCRAFT HAVING PILLOW BLOCK MOUNTED PYLON ASSEMBLIES

(71) Applicant: Bell Helicopter Textron Inc., Fort Worth, TX (US)

(72) Inventors: Jeffrey Matthew Williams, Fort Worth, TX (US); James Elbert King, Fort Worth, TX (US); James Everett Kooiman, Fort Worth, TX (US); Andrew G. Baines, Fort Worth, TX (US); Christopher R. Jackson, Fort Worth, TX (US); George Ryan Decker, Fort Worth, TX (US); Daniel J. Sweigard, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/407,471

(22) Filed: Jan. 17, 2017

(65) Prior Publication Data

US 2017/0305566 A1    Oct. 26, 2017

Related U.S. Application Data

(63) Continuation-in-part of application No. 13/966,726, filed on Aug. 14, 2013, now Pat. No. 9,834,303.

(51) Int. Cl.
*B64D 27/26* (2006.01)
*F16H 57/021* (2012.01)
(Continued)

(52) U.S. Cl.
CPC ........... *B64D 27/26* (2013.01); *B64C 3/32* (2013.01); *B64C 27/26* (2013.01);
(Continued)

(58) Field of Classification Search
CPC ....... B64C 27/22; B64C 29/0033; B64C 3/32; B64C 27/26; B64D 27/26;
(Continued)

(56) References Cited

U.S. PATENT DOCUMENTS

| 2,814,451 A | 11/1957 | Turner et al. |
| 2,936,967 A | 5/1960 | Dancik |

(Continued)

*Primary Examiner* — Valentina Xavier
(74) *Attorney, Agent, or Firm* — Lawrence Youst PLLC

(57) ABSTRACT

A propulsion system for a tiltrotor aircraft includes an engine supported by the airframe and a fixed gearbox operably coupled to the engine. Inboard and outboard pedestals are supported by the airframe and positioned above the wing. A pylon assembly is rotatably coupled between the inboard and outboard pedestals. The pylon assembly includes a spindle gearbox having an input gear, a mast operably coupled to the input gear and a proprotor assembly operable to rotate with the mast. The spindle gearbox is rotatable about a conversion axis to selectively operate the tiltrotor aircraft between helicopter and airplane modes. A common shaft, rotatable about the conversion axis, is configured to transfer torque from an output gear of the fixed gearbox to the input gear of the spindle gearbox. Each of the inboard and outboard pedestals includes a pillow block housing such as a full or a split pillow block housing.

20 Claims, 12 Drawing Sheets

(51) Int. Cl.
*F16H 57/025* (2012.01)
*B64C 29/00* (2006.01)
*B64C 27/26* (2006.01)
*B64C 3/32* (2006.01)
*B64D 35/00* (2006.01)
*F16H 57/02* (2012.01)

(52) U.S. Cl.
CPC .......... *B64C 29/0033* (2013.01); *B64D 35/00* (2013.01); *F16H 57/021* (2013.01); *F16H 57/025* (2013.01); *B64D 2027/264* (2013.01); *B64D 2027/266* (2013.01); *F16H 2057/02043* (2013.01)

(58) Field of Classification Search
CPC ........ B64D 2027/264; B64D 2027/266; B64D 35/00; B64F 5/0081; Y10T 74/1966; Y10T 29/49318
See application file for complete search history.

(56) References Cited

U.S. PATENT DOCUMENTS

| | | | |
|---|---|---|---|
| 2,936,968 A | 5/1960 | Mazzitelli | |
| 3,065,929 A | 11/1962 | Holland | |
| 3,259,343 A | 7/1966 | Ropes | |
| 3,284,027 A | 11/1966 | Marc | |
| 3,360,217 A | 12/1967 | Trotter | |
| 3,703,832 A * | 11/1972 | Lindsey | G01C 19/28 74/5.45 |
| 3,797,783 A * | 3/1974 | Kisovec | B64C 29/0033 244/7 A |
| 4,136,845 A | 1/1979 | Eickmann | |
| 4,142,697 A | 3/1979 | Fradenburgh | |
| 4,436,261 A | 3/1984 | Koleff | |
| 4,496,120 A | 1/1985 | Eickmann | |
| 4,682,512 A | 7/1987 | Peterson | |
| 4,691,878 A * | 9/1987 | Vaughan | B64C 3/56 244/49 |
| 4,783,023 A | 11/1988 | Jupe | |
| 4,979,698 A | 12/1990 | Lederman | |
| 5,054,716 A | 10/1991 | Wilson | |
| 5,085,315 A | 2/1992 | Sambell | |
| 5,645,250 A | 7/1997 | Gevers | |
| 5,749,540 A * | 5/1998 | Arlton | B64C 27/82 244/17.13 |
| 6,030,177 A * | 2/2000 | Hager | B64C 27/72 244/17.23 |
| 6,260,793 B1 | 7/2001 | Balayn et al. | |
| 6,276,633 B1 | 8/2001 | Balayn et al. | |
| 6,367,736 B1 | 4/2002 | Pancotti | |
| 6,607,161 B1 | 8/2003 | Krysinski et al. | |
| 6,843,447 B2 | 1/2005 | Morgan | |
| 6,974,105 B2 | 12/2005 | Pham | |
| 7,520,041 B1 | 4/2009 | Aguilar | |
| 7,584,923 B2 | 9/2009 | Burrage | |
| 7,866,598 B2 | 1/2011 | Waide et al. | |
| 7,871,033 B2 | 1/2011 | Karem et al. | |
| 7,874,513 B1 | 1/2011 | Smith | |
| 7,913,947 B2 | 3/2011 | Haynes et al. | |
| 8,152,096 B2 | 4/2012 | Smith | |
| 8,251,305 B2 | 8/2012 | Smith et al. | |
| 8,276,840 B2 | 10/2012 | Karem | |
| 8,567,709 B2 | 10/2013 | Smith et al. | |
| 8,602,347 B2 * | 12/2013 | Isaac | B64C 29/0033 244/23 B |
| 8,733,690 B2 | 5/2014 | Bevirt et al. | |
| 9,126,678 B2 | 9/2015 | Ross et al. | |
| 9,174,731 B2 | 11/2015 | Ross et al. | |
| 9,376,206 B2 | 6/2016 | Ross et al. | |
| 2004/0038768 A1 | 2/2004 | Thomassey et al. | |
| 2005/0045762 A1 | 3/2005 | Pham | |
| 2005/0127238 A1 | 6/2005 | Ballew | |
| 2007/0102573 A1 | 5/2007 | Goto | |
| 2007/0158494 A1 | 7/2007 | Burrage | |
| 2007/0205325 A1 * | 9/2007 | Waide | B64D 35/04 244/60 |
| 2009/0227415 A1 * | 9/2009 | Buelna | B64C 29/0033 475/346 |
| 2010/0276549 A1 | 11/2010 | Karem | |
| 2010/0327123 A1 | 12/2010 | Smith et al. | |
| 2011/0114797 A1 | 5/2011 | Karem | |
| 2012/0199699 A1 | 8/2012 | Isaac et al. | |
| 2013/0078100 A1 * | 3/2013 | Baskin | B64C 11/06 416/204 R |
| 2014/0034781 A1 | 2/2014 | Kouros et al. | |
| 2015/0048214 A1 | 2/2015 | Bockmiller et al. | |
| 2016/0122039 A1 * | 5/2016 | Ehinger | B64C 27/32 416/170 R |
| 2017/0158323 A1 * | 6/2017 | Ross | B64C 29/0033 |
| 2017/0225780 A1 * | 8/2017 | Kooiman | B64C 29/0033 |

* cited by examiner

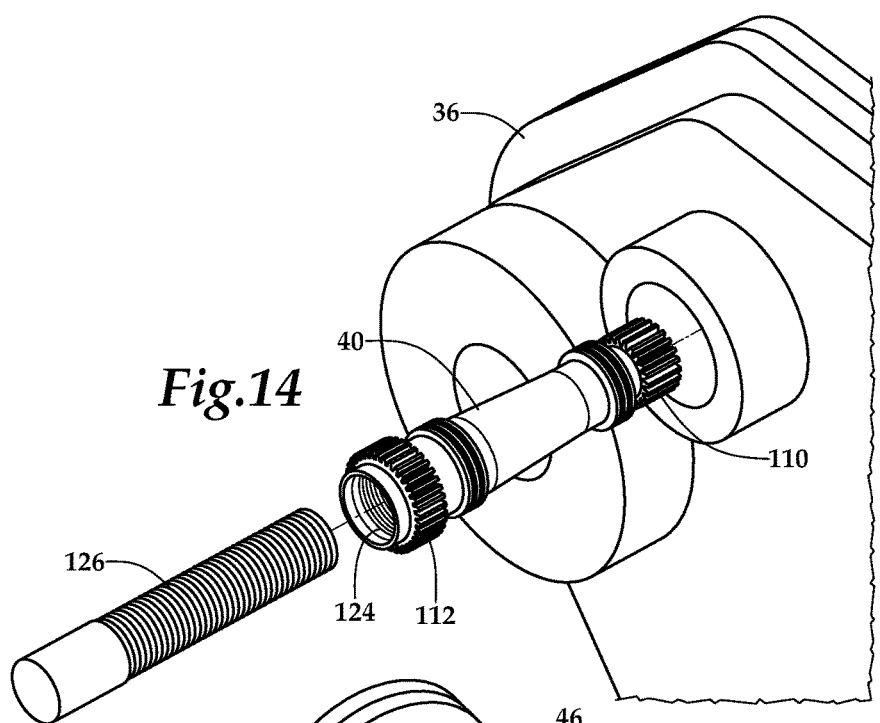
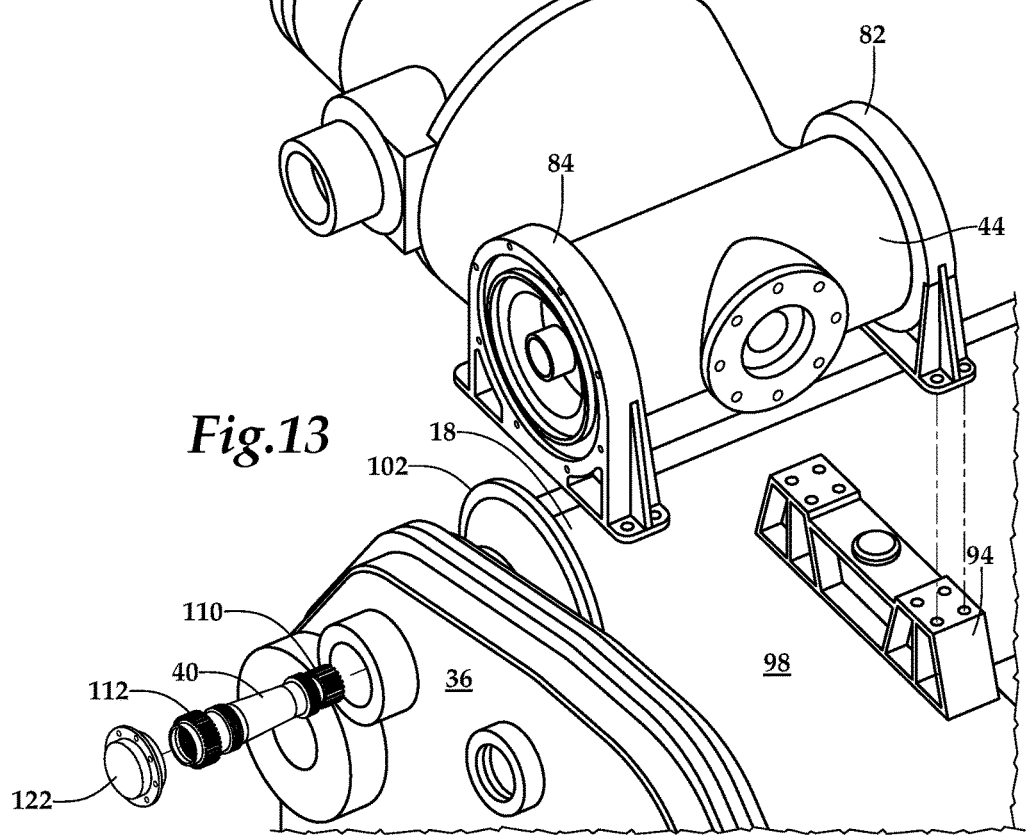

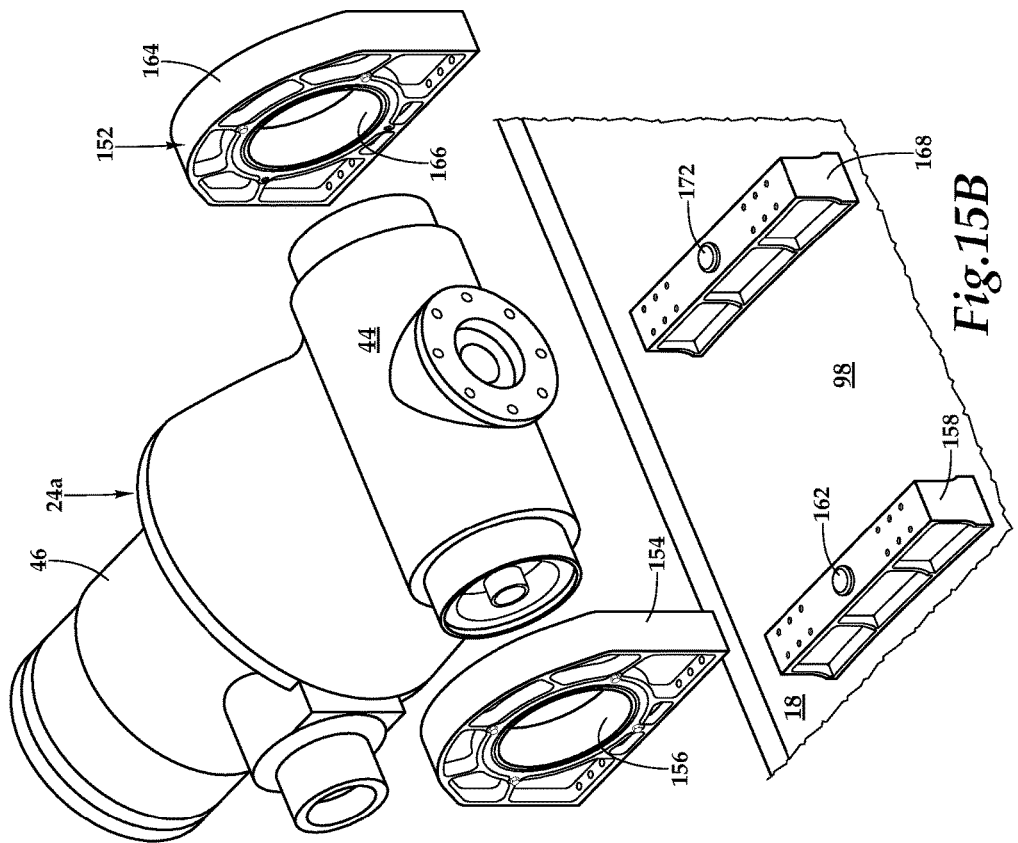
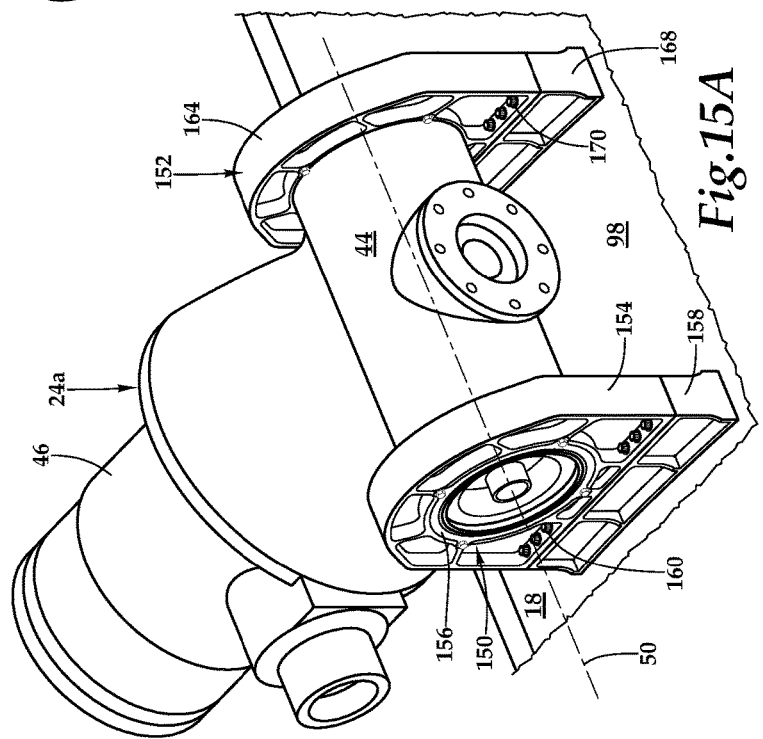

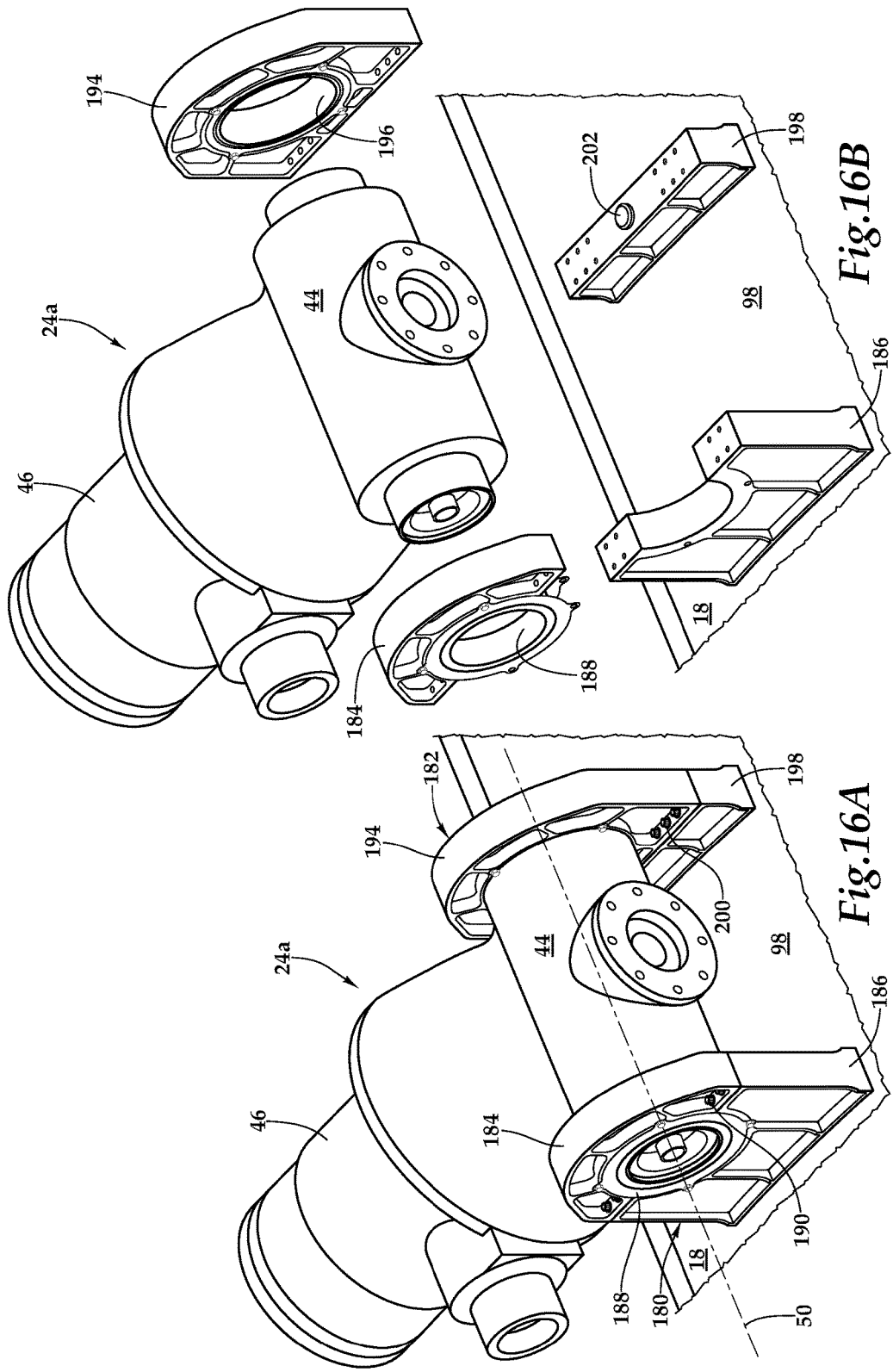

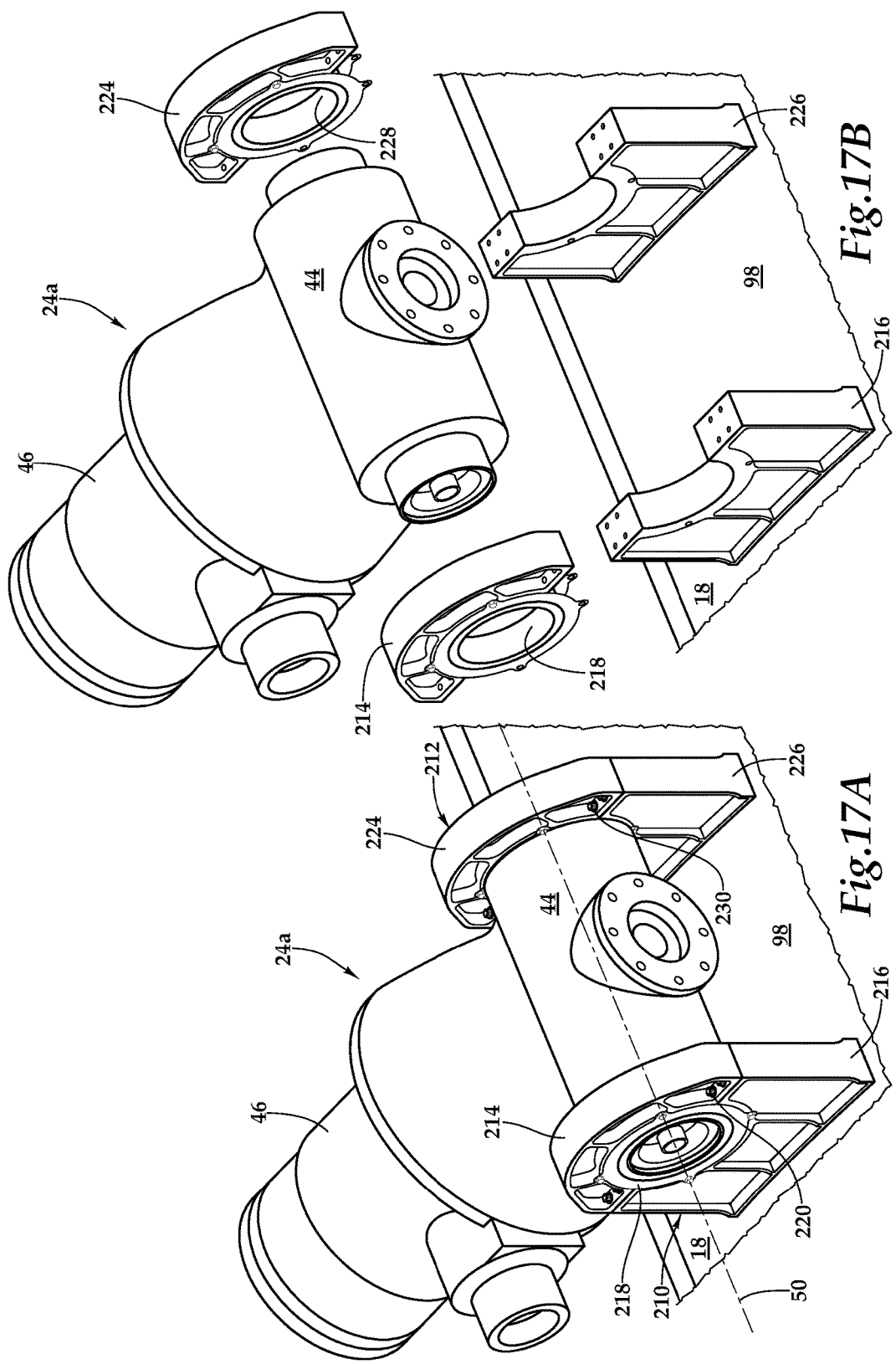

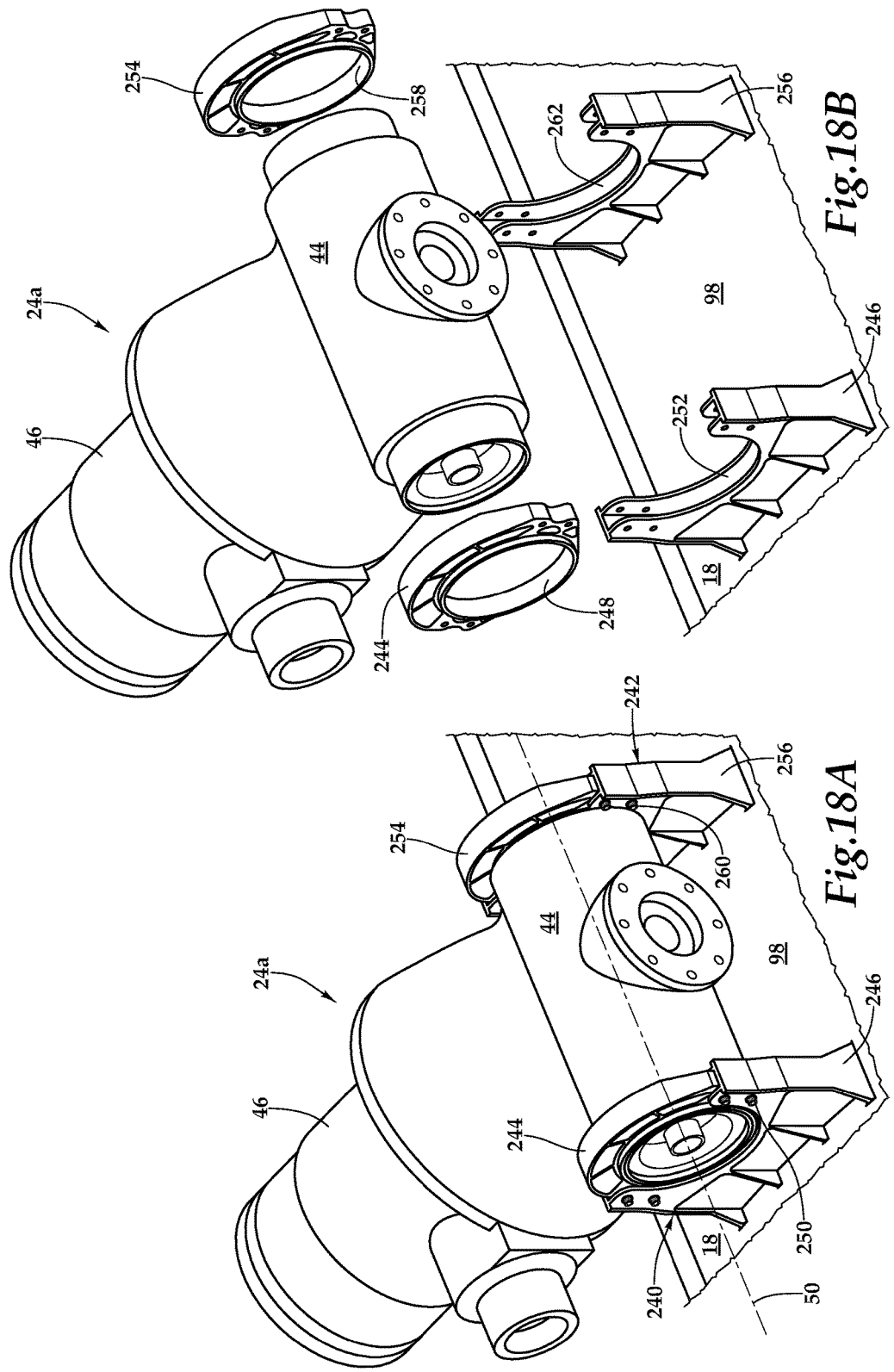

TILTROTOR AIRCRAFT HAVING PILLOW BLOCK MOUNTED PYLON ASSEMBLIES

CROSS-REFERENCE TO RELATED APPLICATIONS

This is a continuation-in-part of co-pending application Ser. No. 13/966,726 filed Aug. 14, 2013.

TECHNICAL FIELD OF THE DISCLOSURE

The present disclosure relates, in general, to tiltrotor aircraft operable for vertical takeoff and landing in a helicopter mode and forward cruising in an airplane mode and, in particular, to tiltrotor aircraft having a fixed engine and rotatable pylon assembly implementation.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It have been found, however, that the outboard location of the nacelles coupled with the requirement of rotating the nacelles significantly influence the size and weight of the airframe structure required to support the nacelles. Accordingly, a need has arisen for improved systems and methods for realizing a tiltrotor aircraft having reduced structural loads generated by the propulsion system.

SUMMARY

In a first aspect, the present disclosure is directed to a propulsion system for a tiltrotor aircraft including an engine supported by the airframe proximate an outboard end of the wing and a fixed gearbox operably coupled to the engine and having an output gear. Inboard and outboard pedestals are supported by the airframe above the wing. A pylon assembly is rotatably coupled between the inboard and outboard pedestals. The pylon assembly includes a spindle gearbox having an input gear, a mast operably coupled to the input gear and a proprotor assembly operable to rotate with the mast. The spindle gearbox is rotatable about a conversion axis to selectively operate the tiltrotor aircraft between helicopter and airplane modes. A common shaft is configured to transfer torque from the output gear of the fixed gearbox to the input gear of the spindle gearbox. The common shaft is rotatable about the conversion axis. Each of the inboard and outboard pedestals includes a pillow block housing.

In some embodiments, the inboard and outboard pedestals may be full pillow block housings. In other embodiments, the inboard and outboard pedestals may be split pillow block housings. In additional embodiments, one of the inboard and outboard pedestals may be a full pillow block housing and the other of the inboard and outboard pedestals may be a split pillow block housing. For example, the inboard pedestal may be a full pillow block housing and the outboard pedestal may be a split pillow block housing. In certain embodiments, the inboard and outboard pedestals may be coupled to the airframe. In such embodiments, the inboard and outboard pedestals may be coupled directly to the airframe or may be coupled to the airframe via an intermediate support. In either case, the coupling between the inboard and outboard pedestals and the airframe may include a sheer boss. In some embodiments, at least a portion of one or both of the inboard and outboard pedestals may be integral with the airframe. In certain embodiments, the inboard and outboard pedestals may support fore/aft loads generated by the proprotor assembly when the tiltrotor aircraft is in the airplane mode and vertical loads generated by the proprotor assembly when the tiltrotor aircraft is in the helicopter mode.

In a second aspect, the present disclosure is directed to a tiltrotor aircraft having a helicopter mode and an airplane mode. Tiltrotor aircraft includes an airframe including a fuselage and a wing. An engine is supported by the airframe proximate an outboard end of the wing. A fixed gearbox is operably coupled to the engine and has an output gear. Inboard and outboard pedestals are supported by the airframe above the wing. A pylon assembly is rotatably coupled between the inboard and outboard pedestals. The pylon assembly includes a spindle gearbox having an input gear, a mast operably coupled to the input gear and a proprotor assembly operable to rotate with the mast. The spindle gearbox is rotatable about a conversion axis to selectively operate the tiltrotor aircraft between helicopter and airplane modes. A common shaft is configured to transfer torque from the output gear of the fixed gearbox to the input gear of the spindle gearbox. The common shaft is rotatable about the conversion axis. Each of the inboard and outboard pedestals includes a pillow block housing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 13 is a perspective view of a propulsion system section of a tiltrotor aircraft in a partially disassembled state in accordance with embodiments of the present disclosure;

FIG. 14 is a perspective view of a propulsion system section of a tiltrotor aircraft in a partially disassembled state in accordance with embodiments of the present disclosure;

FIGS. 15A-15B are perspective and exploded views of a pylon assembly positioned above a wing between inboard and outboard pedestals in accordance with embodiments of the present disclosure;

FIGS. 16A-16B are perspective and exploded views of a pylon assembly positioned above a wing between inboard and outboard pedestals in accordance with embodiments of the present disclosure;

FIGS. 17A-17B are perspective and exploded views of a pylon assembly positioned above a wing between inboard and outboard pedestals in accordance with embodiments of the present disclosure;

FIGS. 18A-18B are perspective and exploded views of a pylon assembly positioned above a wing between inboard and outboard pedestals in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections and the term "pedestal" will refer to the structure above the wing to which the pylon assembly is mounted.

Figure 1:
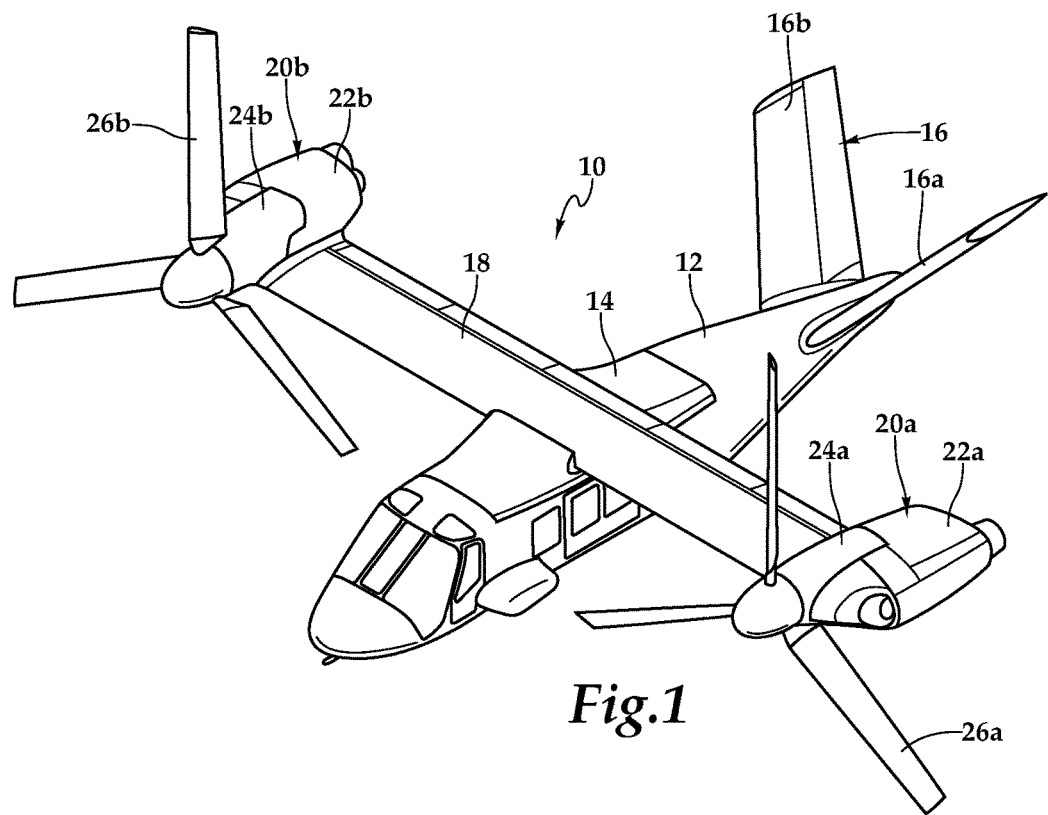
FIG. 1 is a perspective view of a tiltrotor aircraft in airplane mode in accordance with embodiments of the present disclosure.
Figure 2:
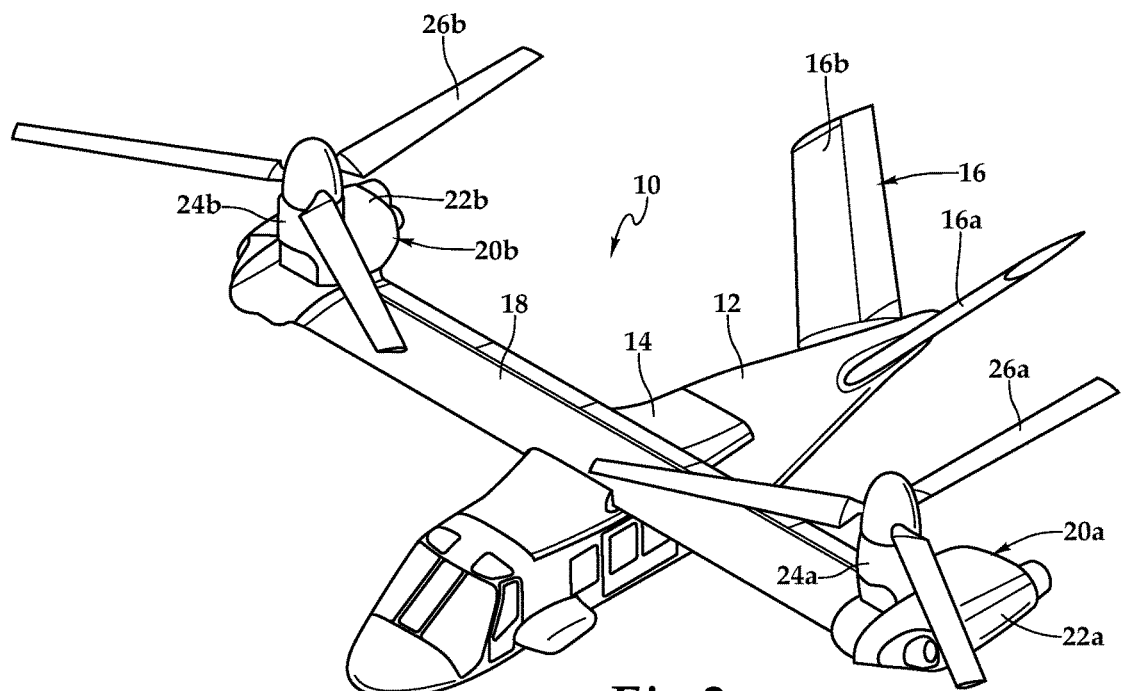
FIG. 2 is a perspective view of a tiltrotor aircraft in helicopter mode in accordance with embodiments of the present disclosure.
Figure 3:
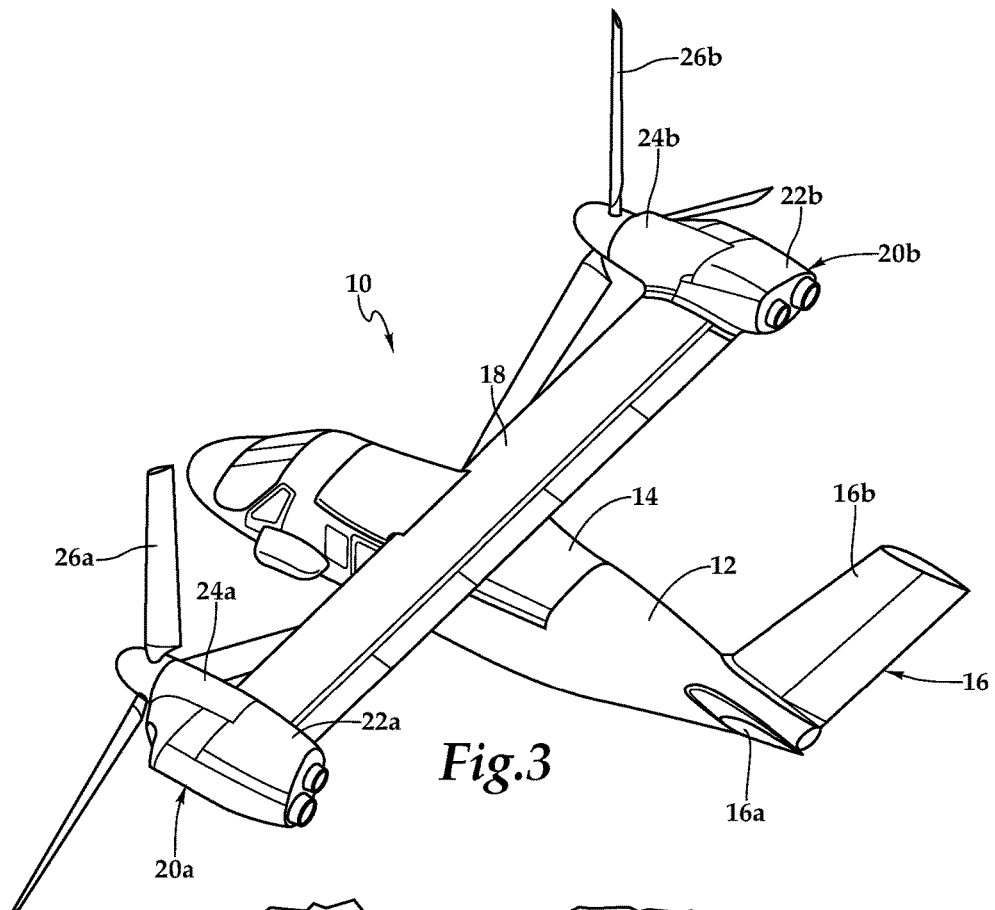
FIG. 3 is a perspective view of a tiltrotor aircraft in airplane mode in accordance with embodiments of the present disclosure.

Referring to FIGS. 1-3 in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally horizontal orientation, as best seen in FIG. 1, a generally vertical orientation, as best seen in FIG. 2. Pylon assembly 24a includes a rotatable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally horizontal orientation, as best seen in FIG. 1, a generally vertical orientation, as best seen in FIG. 2. Pylon assembly 24b includes a rotatable portion of the drive system and a proprotor assembly 26b that is rotatable responsive to torque and rotational energy provided via the engine and drive system.

FIGS. 1 and 3 illustrate aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 2 illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between airplane mode and helicopter mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having a single engine which may be housed within one of the fixed nacelles or within the fuselage that provides torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that even though propulsion systems 20a, 20b are illustrated in the context of tiltrotor aircraft 10, the propulsion systems of the present disclosure can be implemented on other types of tiltrotor aircraft including, for example, quad tiltrotor aircraft and unmanned tiltrotor aircraft, to name a few.

Referring now to FIGS. 4-11, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36. Fixed gearbox 36 includes a plurality of gears, such as helical gears, in a gear train that are coupled to an interconnect drive shaft 38 and a common shaft depicted as quill shaft 40. Torque is transferred to an input gear 42 in spindle gearbox 44 of proprotor gearbox 46 through quill shaft 40.

Figure 8:
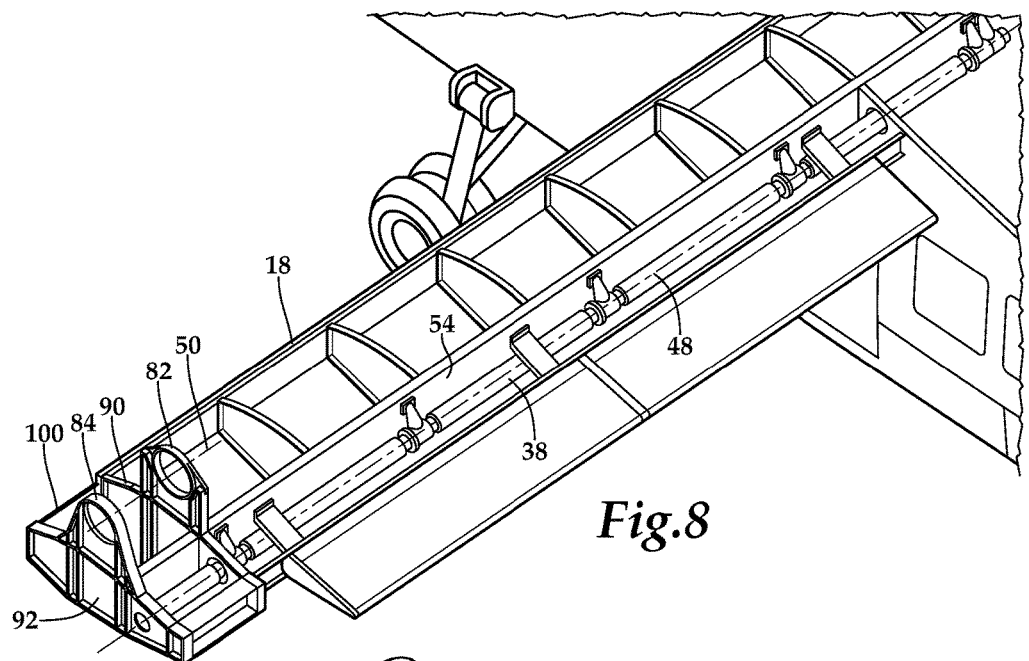
FIG. 8 is a perspective view of a wing section of a tiltrotor aircraft in accordance with embodiments of the present disclosure.
Figure 9:
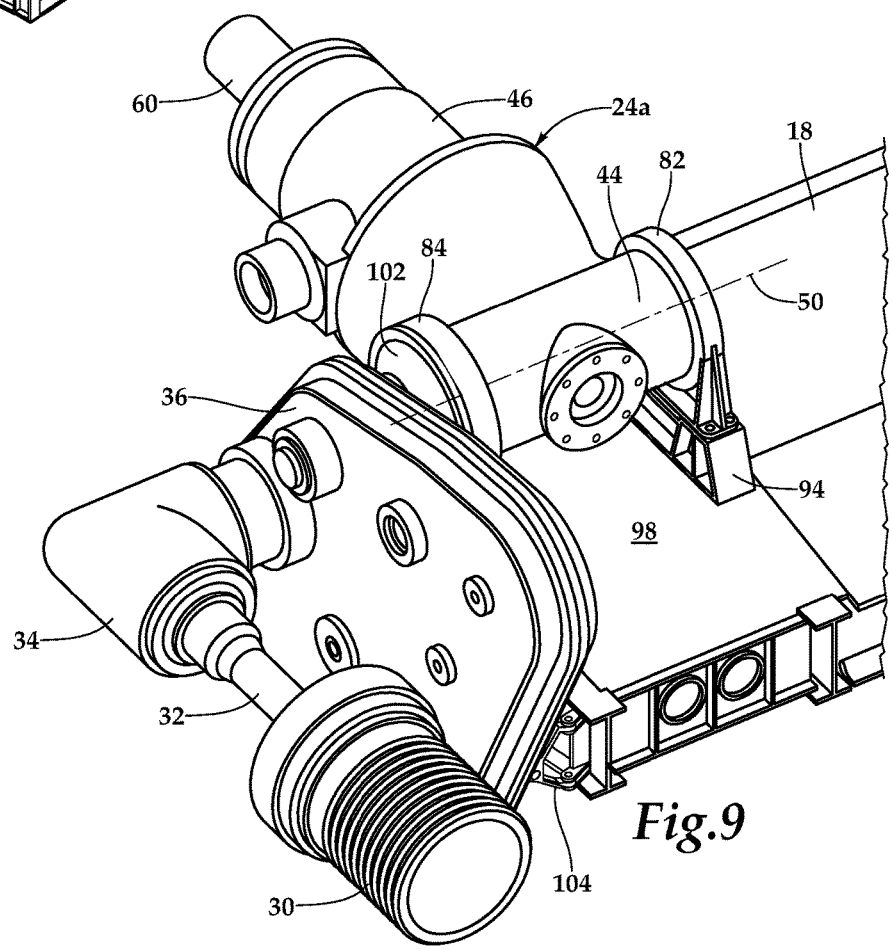
FIG. 9 is a perspective view of a propulsion system of a tiltrotor aircraft in accordance with embodiments of the present disclosure.
Figure 10:
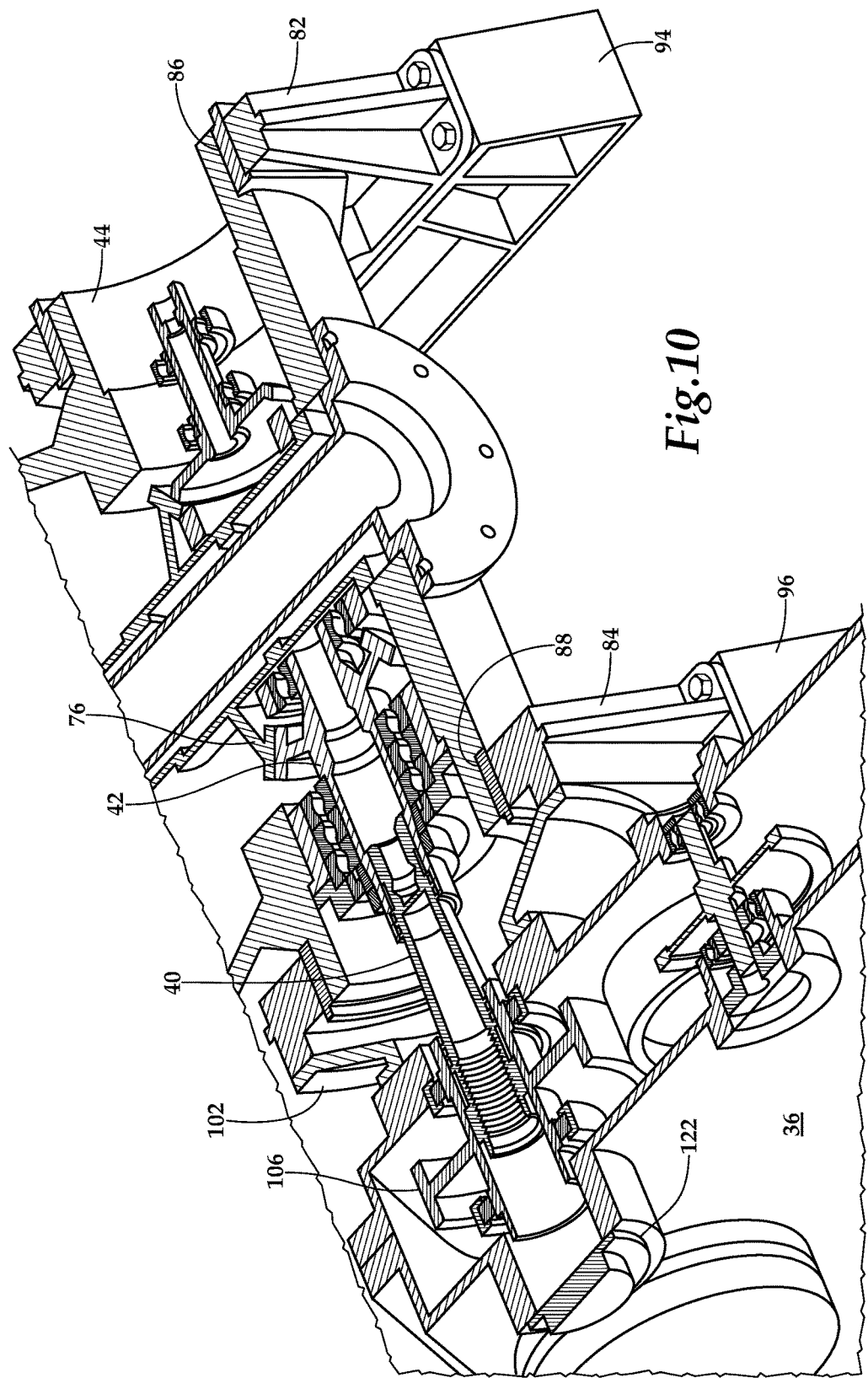
FIG. 10 is a cross sectional view of a propulsion system section of a tiltrotor aircraft in accordance with embodiments of the present disclosure.

Interconnect drive shaft 38 provides a torque path that enables a single engine to provide torque to both proprotors assemblies 26a, 26b in the event of a failure of the other engine. In the illustrated embodiment, interconnect drive shaft 38 has a rotational axis 48 that is vertically lower and horizontally aft of a longitudinal axis of the spindle gearbox 44 referred to herein as a conversion axis 50. Conversion axis 50 is parallel to a lengthwise axis 52 of wing 18. Referring in particular to FIG. 8, interconnect drive shaft 38 includes a plurality of segments that share rotational axis 48. Locating interconnect drive shaft 38 aft of wing spar 54, which is a structural member of the airframe of tiltrotor aircraft 10, provides for optimal integration with fixed gearbox 36 without interfering with the primary torque transfer of quill shaft 40 between fixed gearbox 36 and spindle gearbox 44. Conversion axis 50 of spindle gearbox 44 is parallel to rotational axis 48 of interconnect drive shaft 38 but located forward and above rotational axis 48.

Figure 4:
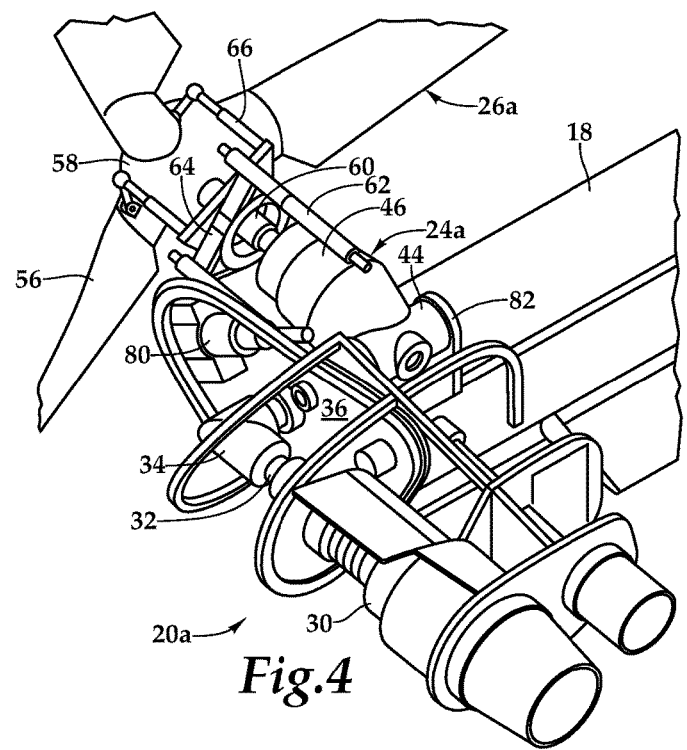
FIG. 4 is a perspective view of a propulsion system of a tiltrotor aircraft in accordance with embodiments of the present disclosure.

As best seen in FIG. 4, proprotor assembly 26a of propulsion system 20a includes a plurality of proprotor blades 56 coupled to a yoke 58 that is coupled to a mast 60. Mast 60 is coupled to proprotor gearbox 46. The collective and/or cyclic pitch of proprotor blades 56 may be controlled responsive to pilot input via actuators 62, swashplate 64 and pitch links 66.

Figure 5:
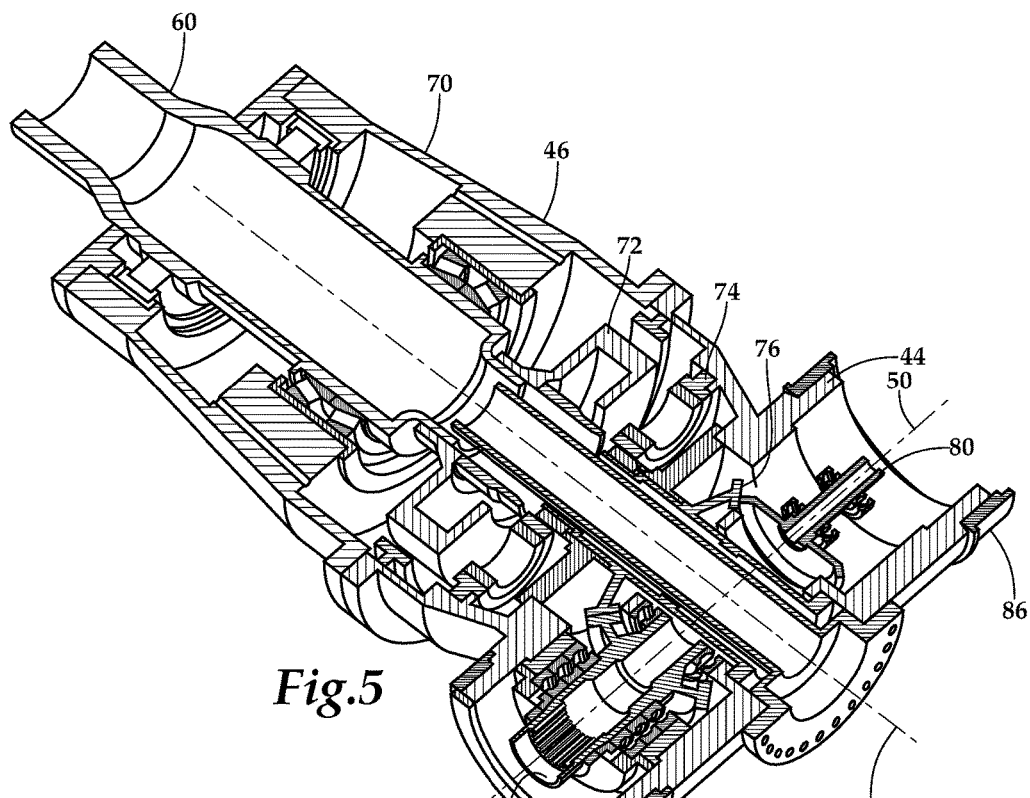
FIG. 5 is a cross sectional view of a pylon assembly of a tiltrotor aircraft in accordance with embodiments of the present disclosure.
Figure 6:
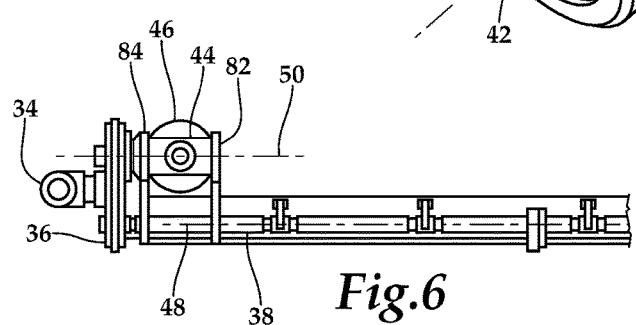
FIG. 6 is an aft view of a propulsion system and wing section of a tiltrotor aircraft in accordance with embodiments of the present disclosure.
Figure 7:
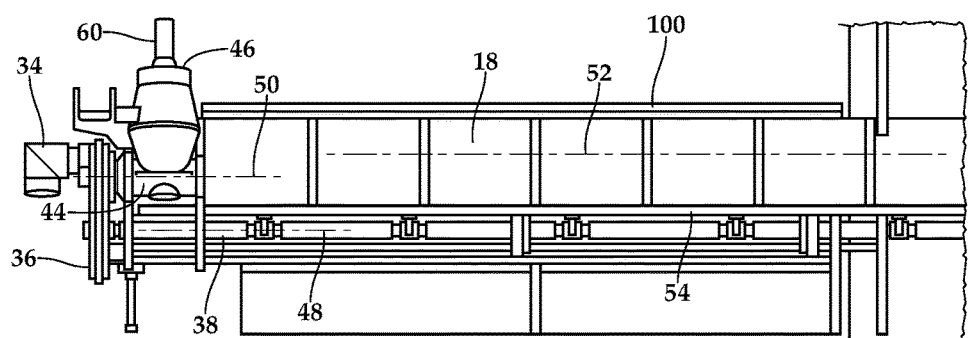
FIG. 7 is a top view of a propulsion system and wing section of a tiltrotor aircraft in accordance with embodiments of the present disclosure.

Referring in particular to FIG. 5, proprotor gearbox 46 is configured to transfer power and reduce speed to mast 60. Proprotor gearbox 46 includes a top case portion 70 and spindle gearbox 44. Speed reduction is accomplished by a low speed planetary gear assembly 72 and a high speed planetary gear assembly 74. A spiral bevel gear assembly includes spiral bevel input gear 42 and a spiral bevel output gear 76. The spiral bevel gear assembly changes power direction from along longitudinal axis 50 of spiral bevel input gear 42 to a centerline axis 78 of spiral bevel output gear 76. An accessory drive 80 can be coupled to spiral bevel output gear 76. It should be appreciated that proprotor gearbox 46 can include additional or different components including bearing systems, lubrication systems and other gearbox related systems that may be beneficial for operation.

During operation, a conversion actuator 80, as best seen in FIG. 4, can be actuated so as to selectively rotate proprotor gearbox 46 and thus pylon assembly 24a about conversion axis 50, which in turn selectively positions proprotor assembly 26a between helicopter mode, as best seen in FIG. 2, and airplane mode, as best seen in FIGS. 1 and 3. The operational loads, such as thrust loads, are transmitted through mast 60 and into spindle gearbox 44 of proprotor gearbox 46 and thus the structural support of spindle gearbox 44 is critical. In the illustrated embodiment, spindle gearbox 44 is rotatably coupled to the airframe of tiltrotor aircraft 10 by mounting spindle gearbox 44 to an inboard pedestal depicted as inboard pillow block 82 having an inboard bearing assembly 86 and an outboard pedestal depicted as outboard pillow block 84 with an outboard bearing assembly 88. Thus, spindle gearbox 44 is structurally supported and is operable to be rotated about conversion axis 50 by conversion actuator 80.

Inboard pillow block 82 is structurally coupled to an inboard tip rib 90. Similarly, outboard pillow block 84 is structurally coupled to an outboard tip rib 92. Inboard tip rib 90 and outboard tip rib 92 are structural members of the airframe of tiltrotor aircraft 10. In the illustrated embodiment, the inboard pedestal includes an inboard intermediate support 94 that is utilized as a structural element between inboard pillow block 82 and inboard tip rib 90. Likewise, the outboard pedestal includes an outboard intermediate support 96 that is utilized as a structural element between outboard pillow block 84 and outboard tip rib 92. It should be appreciated that the exact structural configuration is implementation specific, and that structural components can be combined and/or separated to meet implementation specific requirements. For example, in certain implementations, airframe structures such as tip ribs 90, 92 may extend above wing 18 and form a portion the inboard and outboard pedestals.

Figure 11:
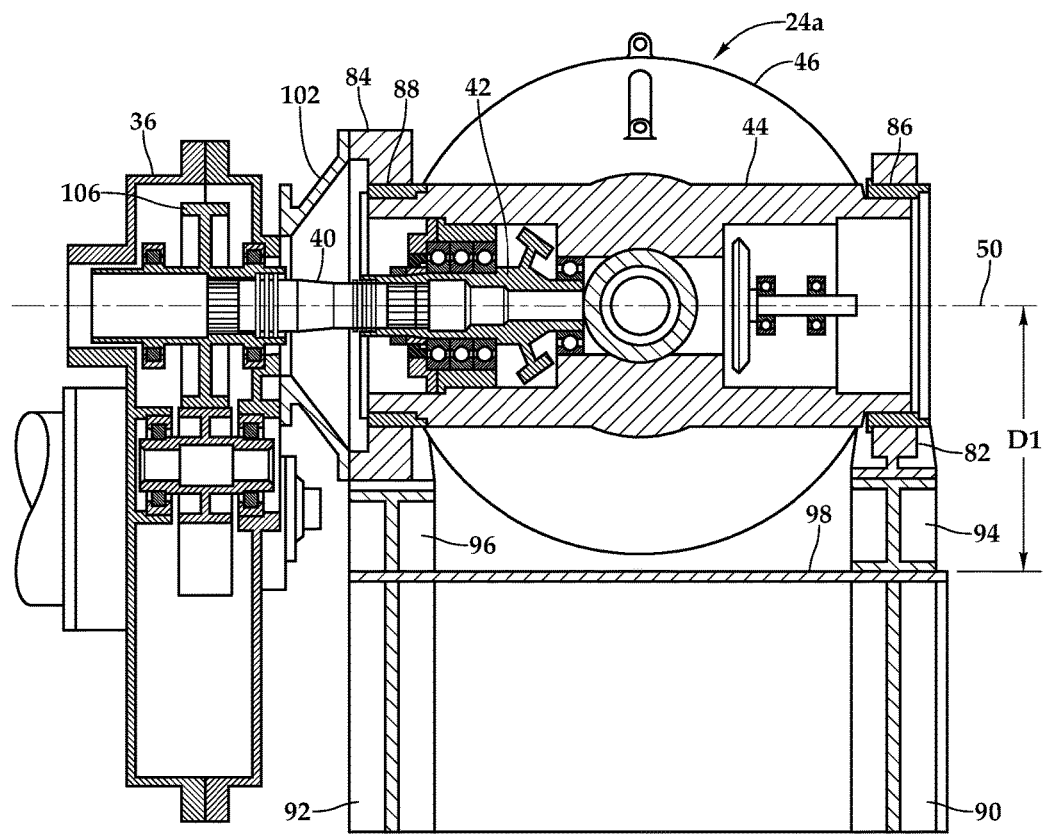
FIG. 11 is a cross sectional view of a propulsion system section of a tiltrotor aircraft in accordance with embodiments of the present disclosure.

Pylon assembly 24a including proprotor gearbox 46 and spindle gearbox 44 is located above a surface of an upper wing skin 98 such that conversion axis 50 is at a distance D1 above upper wing skin 98, as best seen in FIG. 11. In addition, pylon assembly 24a is generally centered between inboard tip rib 90 and outboard tip rib 92. One advantage of locating pylon assembly 24a above the surface of upper wing skin 98 is that the fore/aft location of pylon assembly 24a can be easily tailored to align the aircraft center of gravity (CG) with conversion axis 50 while pylon assembly 24a is in helicopter mode, while also aligning the aircraft center of gravity (CG) with the wing aerodynamic center of lift while pylon assembly 24a is in airplane mode. It is noted that the aircraft center of gravity (CG) shifts as pylon assembly 24a rotates between helicopter mode and airplane mode. As such, locating pylon assembly 24a above the wing allows the exact fore/aft location to be optimized, while also structurally attaching pylon assembly 24a to a portion of the airframe in the form of a torque box defined by forward wing spar 100, aft wing spar 54, inboard tip rib 90 and outboard tip rib 92.

The location of the spindle gearbox 44 provides an efficient structural support for enduring operational loads by being mounted within the structural torque box. For example, when aircraft 10 is in helicopter mode, torque about mast axis 78 is reacted by the torque box. It should be noted that location of spindle gearbox 44 positions mast axis 78, while in helicopter mode, inboard of outboard tip rib 92, outboard of inboard tip rib 90, forward of aft spar 54 and aft of forward spar 100, which allows the axis of the torque to be inside of the torque box structure, rather than cantilevered outside of the torque box structure. In contrast, a spindle gearbox location outside (such as outboard, forward or aft) would cause a moment that would increase operational loading, thus requiring heavier and less efficient structural support.

Fixed gearbox 36 extends generally normal to conversion axis 50 and is coupled to the airframe by a support assembly preferably having multiple joints. In the illustrated embodiment, the support assembly includes a fixed joint depicted as a bolted connection to a housing 102 that is supported by the airframe of tiltrotor aircraft 10 via outboard pillow block 84 and outboard intermediate support 96. As illustrated, housing 102 is a conical structure with one or more flanges configured to support bolted connections with fixed gearbox 36 and with outboard pillow block 84. The support assembly also includes one or more joints 104 that provide support between fixed gearbox 36 and the airframe of tiltrotor aircraft 10, only one of which being visible in FIG. 9. It is noted that joint 102 is the primary support structure between fixed gearbox 36 and the airframe. This is significant because the support assembly is configured to maintain collinear alignment between fixed gearbox 36 and spindle gearbox 44. If the primary attachment structure was not common with the attachment structure of spindle gearbox 44, then operation loading, such as load deflection and/or thermal growth, would dramatically increase the potential for misalignment therebetween. Joints 104 may be stiff in certain directions but soft in other directions such as stiff in the inboard/outboard and vertical directions, but soft in the fore/aft direction and/or stiff in the inboard/outboard and fore/aft directions, but soft in the vertical direction.

Power is transferred from an output gear 106 of fixed gearbox 36 to input gear 42 of spindle gearbox 44 through quill shaft 40. Quill shaft 40 is a floating shaft configured to accept certain misalignment due to manufacturing tolerances and operational effects between fixed gearbox 36 and rotating spindle gearbox 44. Quill shaft 40 is configured to be assembled and disassembled independently from fixed gearbox 36 and rotating spindle gearbox 44. As such, quill shaft 40 can be removed without removing either of fixed gearbox 36 or rotating spindle gearbox 44.

Figure 12:
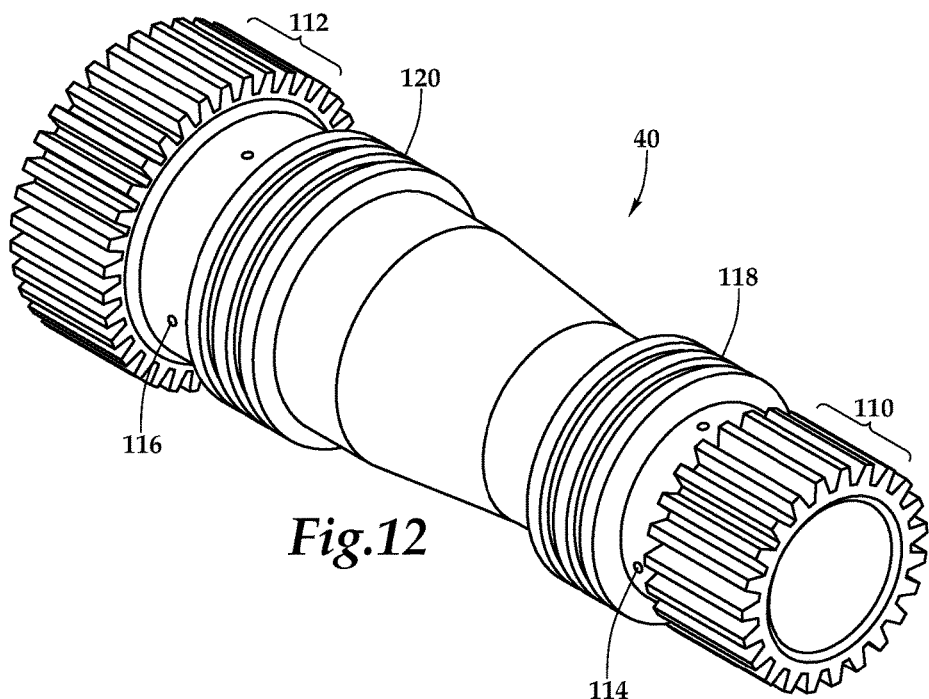
FIG. 12 is a perspective view of a quill shaft in accordance with embodiments of the present disclosure.

Referring also to FIGS. 12-14, quill shaft 40 has a first splined portion 110 and a second splined portion 112. In the illustrated embodiment, first splined portion 110 has a smaller diameter than second splined portion 112, thus first splined portion 110 is located inboard and second splined portion 112 is located outboard so that quill shaft 40 can be removed to the outboard direction for inspection/maintenance thereof. Quill shaft 40 includes one or more inboard lubrication ports 114 and outboard lubrication ports 116. Quill shaft 40 also includes a first set of o-ring glands 118 and a second set of o-ring glands 120.

During operation, second splined portion 112 is in torque engagement with output gear 106 of fixed gearbox 36 while first splined portion 110 is in torque engagement with input gear 42 of spindle gearbox 44. In the illustrated embodiment, first splined portion 110 and second splined portion 112 are crowned to promote teeth engagement in the event of collinear misalignment between spindle gearbox 44 and fixed gearbox 36. Lubrication oil is circulated to the mating surfaces of first splined portion 110 through inboard lubrication ports 114, the seals associated with the first set of o-ring glands 118 forcing the lubrication fluid to flow to the first splined portion 110 instead of flowing toward the center of quill shaft 40. Similarly, lubrication oil is circulated to the mating surfaces of the second splined portion 112 through outboard lubrication ports 116, the seals associated with the second set of o-ring glands 120 forcing the lubrication fluid to flow to second splined portion 112 instead of flowing toward the center of quill shaft 40.

One unique aspect of the configuration of quill shaft 40 in conjunction with spindle gearbox 44 and fixed gearbox 36 is that quill shaft 40 can be removed without removing either of the spindle gearbox 44 or fixed gearbox 36. An access cover 122 can be removed thereby accessing the second splined portion 112 of quill shaft 40. An interior portion 124 includes a feature, such as threads, for which a removal tool 126 can attach thereto. In one embodiment, interior portion 124 has female threads, while removal tool 126 has male threads that mate thereto. Upon attachment of removal tool 126, quill shaft 40 can be removed by pulling in an outboard direction along the centerline axis of quill shaft 40. Quill shaft 40 is critical for the operation of aircraft 10, as such, safety and efficiency of operation is improved by increasing the ease for which quill shaft 40 can be inspected.

Referring next to FIGS. 15A-15B of the drawings, therein is depicted a mounting implementation for a pylon assembly above a wing of a tiltrotor aircraft. For the present discussion, only proprotor gearbox 46 and spindle gearbox 44 of pylon assembly 24a have been shown. Pylon assembly 24a is rotatably coupled between outboard pedestal 150 and inboard pedestal 152. In the illustrated embodiment, outboard pedestal 150 includes a full pillow block housing 154 that provides a full diameter case to receive a bearing assembly 156 therein. Bearing assembly 156 may be a journal bearing assembly, a spherical bearing assembly or other suitable bearing assembly type. Bearing assembly 156 is coupled to full pillow block housing 154 using bolts or other suitable fasteners and provides a low friction environment for rotation of spindle gearbox 44 about conversion axis 50. In the illustrated embodiment, outboard pedestal 150 includes an upper portion of outboard tip rib 158 that extends above wing 18. Full pillow block housing 154 is coupled to outboard tip rib 158 using suitable fasteners depicted as a plurality of bolts 160. As best seen in FIG. 15B, outboard tip rib 158 preferably includes a sheer boss 162 that mates with a close fitting cavity in the lower surface of full pillow block housing 154.

In the illustrated embodiment, inboard pedestal 152 includes a full pillow block housing 164 that provides a full diameter case to receive a bearing assembly 166 therein. Bearing assembly 166 may be a journal bearing assembly, a spherical bearing assembly or other suitable bearing assembly type. Bearing assembly 166 is coupled to full pillow block housing 164 using bolts or other suitable fasteners and provides a low friction environment for rotation of spindle gearbox 44 about conversion axis 50. In the illustrated embodiment, inboard pedestal 152 includes an upper portion of inboard tip rib 168 that extends above wing 18. Full pillow block housing 164 is coupled to inboard tip rib 168 using suitable fasteners depicted as a plurality of bolts 170. As best seen in FIG. 15B, inboard tip rib 168 preferably includes a sheer boss 172 that mates with a close fitting cavity in the lower surface of full pillow block housing 164. Even though the lower sections of outboard pedestal 150 and inboard pedestal 152 have been described as being integral with outboard tip rib 158 and inboard tip rib 168, those having ordinary skill in the art will recognize that the lower sections of outboard pedestal 150 and inboard pedestal 152 could alternatively include one or more intermediate supports, in which case, item 158 would represent an outboard intermediate support such as outboard intermediate support 96 discussed above and item 168 would represent an inboard intermediate support such as inboard intermediate support 94 discussed above.

It is desirable to be able to remove pylon assembly 24a vertically relative to wing 18 for inspection, maintenance or other protocols. As best seen in FIG. 15B, full pillow block housing 154 can be separated from outboard tip rib 158 by removing bolts 160 and full pillow block housing 164 can be separated from inboard tip rib 168 by removing bolts 170. Pylon assembly 24a together with full pillow block housings 154, 164 may then be vertically lifted off tip ribs 158, 168. Full pillow block housing 154 together with bearing assembly 156 and full pillow block housing 164 together with bearing assembly 166 may then be laterally removed from spindle gearbox 44. This procedure may be reversed to install pylon assembly 24a on the tiltrotor aircraft. Full pillow block housing 154 together with bearing assembly 156 and full pillow block housing 164 together with bearing assembly 166 are laterally mounted to spindle gearbox 44. Thereafter, pylon assembly 24a together with full pillow block housings 154, 164 are lowered onto tip ribs 158, 168 such that sheer boss 162 mates with the close fitting cavity in the lower surface of full pillow block housing 154 and sheer boss 172 mates with the close fitting cavity in the lower surface of full pillow block housing 164. This arrangement aides in establishing proper alignment between spindle gearbox 44 and other critical components of the tiltrotor aircraft, such as fixed gearbox 36. Full pillow block housing 154 can now be coupled to outboard tip rib 158 with bolts 160 and full pillow block housing 164 can now be coupled to inboard tip rib 168 with bolts 170.

In operation, outboard pedestal 150 and inboard pedestal 152 must support fore/aft loads generated by the proprotor assembly when the tiltrotor aircraft is cruising in airplane mode. In the illustrated embodiment, the shear forces between outboard tip rib 158 and full pillow block housing 154 react on sheer boss 162 which not only acts to maintain collinear alignment between output gear 106 of fixed gearbox 36 and input gear 42 of spindle gearbox 44 but also prevents shear forces from acting on bolts 160. Likewise, the shear forces between inboard tip rib 168 and full pillow block housing 164 react on sheer boss 172 which prevents shear forces from acting on bolts 170. Outboard pedestal 150 and inboard pedestal 152 must also support vertical loads during all flight operations including peak vertical loads that are generated by the proprotor assembly when the tiltrotor aircraft is in helicopter mode. In the illustrated embodiment, bolts 160 react to support tension forces between outboard tip rib 158 and full pillow block housing 154 while bolts 170 react to support tension forces between inboard tip rib 168 and full pillow block housing 164. In addition, bolts 160 must react to support certain bending moments between outboard tip rib 158 and full pillow block housing 154 while bolts 170 must react to support certain bending moments between inboard tip rib 168 and full pillow block housing 164. These bending moments may be generated due to lateral movements or vibrations caused by operating modes of the proprotor assembly.

Use of full pillow block housings in pedestals 150, 152 enables vertical removal and installation of pylon assembly 24a. In addition, the full pillow block housings enable final installation of the bearing assemblies within the full pillow block housings prior to the installation of pylon assembly 24a within the full pillow block housings. The maximum stiffness of outboard pedestal 150 and inboard pedestal 152 is limited, however, due to the split lines in outboard pedestal 150 and inboard pedestal 152 between the full pillow block housings and the tip ribs. If greater stiffness in the coupling between pylon assembly 24a and the airframe is desired, one or both of the outboard and inboard pedestals may be modified as discussed below.

For example, referring next to FIGS. 16A-16B of the drawings, pylon assembly 24a is rotatably coupled between outboard pedestal 180 and inboard pedestal 182. In the illustrated embodiment, outboard pedestal 180 is depicted as a split pillow block housing including a pillow block cap 184 and a pillow block base 186 that together provide a split diameter case to receive a bearing assembly 188 therein. Bearing assembly 188 may be a journal bearing assembly, a spherical bearing assembly or other suitable bearing assembly type. Bearing assembly 188 is coupled to pillow block cap 184 and pillow block base 186 using bolts or other suitable fasteners and provides a low friction environment for rotation of spindle gearbox 44 about conversion axis 50. In the illustrated embodiment, pillow block base 186 is integral with and forms an upper portion of an outboard tip rib extending above wing 18. Alternatively, pillow block base 186 may be coupled to an outboard tip rib disposed within or partially within wing 18. Pillow block cap 184 and pillow block base 186 are coupled together using suitable fasteners depicted as a plurality of bolts 190.

In the illustrated embodiment, inboard pedestal 182 includes a full pillow block housing 194 that provides a full diameter case to receive a bearing assembly 196 therein. Bearing assembly 196 may be a journal bearing assembly, a spherical bearing assembly or other suitable bearing assembly type. Bearing assembly 196 is coupled to full pillow block housing 194 using bolts or other suitable fasteners and provides a low friction environment for rotation of spindle gearbox 44 about conversion axis 50. In the illustrated embodiment, inboard pedestal 182 includes an upper portion of inboard tip rib 198 that extends above wing 18. Full pillow block housing 194 is coupled to inboard tip rib 198 using suitable fasteners depicted as a plurality of bolts 200. As best seen in FIG. 16B, inboard tip rib 198 preferably includes a sheer boss 202 that mates with a close fitting cavity in the lower surface of full pillow block housing 194.

It is desirable to be able to remove pylon assembly 24a vertically relative to wing 18 for inspection, maintenance or other protocols. As best seen in FIG. 16B, pillow block cap 184 can be separated from pillow block base 186 by removing bolts 190 and by removing the bolts that couple bearing assembly 188 to pillow block base 186. Full pillow block housing 194 can be separated from inboard tip rib 198 by removing bolts 200. Pylon assembly 24a together with pillow block cap 184, bearing assembly 188 and full pillow block housings 194 may then be vertically lifted off tip ribs 186, 198. Pillow block cap 184 together with bearing assembly 188 and full pillow block housing 194 together with bearing assembly 196 may then be laterally removed from spindle gearbox 44. This procedure may be reversed to install pylon assembly 24a on the tiltrotor aircraft. Pillow block cap 184 together with bearing assembly 188 and full pillow block housing 194 together with bearing assembly 196 are laterally mounted to spindle gearbox 44. Thereafter, pylon assembly 24a together with pillow block cap 184, bearing assembly 188 and full pillow block housings 194 are lowered onto tip ribs 186, 198 such that sheer boss 202 mates with the close fitting cavity in the lower surface of full pillow block housing 194. Pillow block cap 184 can now be coupled to pillow block base 186 with bolts 190 and bearing assembly 188 can also be coupled to pillow block base 186. In addition, full pillow block housing 194 can now be coupled to inboard tip rib 198 with bolts 200.

In operation, outboard pedestal 180 and inboard pedestal 182 must support fore/aft loads and vertical loads generated by the proprotor assembly when the tiltrotor aircraft is cruising in airplane mode and/or operating in helicopter mode. In the illustrated embodiment, the load spectrum on bolts 190 includes sheer forces and tension forces but minimal bending moments as the split line between pillow block cap 184 and pillow block base 186 is coincident with the centerline of spindle gearbox 44. The load spectrum on bolts 200 includes tension forces and bending moments but minimal shear forces which react instead on sheer boss 202. Use of a split pillow block housing in outboard pedestal 180 and a full pillow block housings in inboard pedestal 182 enables vertical removal and installation of pylon assembly 24a. In addition, the split pillow block housing including a tip rib as the pillow block base enables stiffness tailoring of outboard pedestal 180 to achieve desired dynamic modes and to maintain the output gear of fixed gearbox 36 in substantial collinear alignment with the input gear of spindle gearbox 44.

Referring next to FIGS. 17A-17B of the drawings, pylon assembly 24a is rotatably coupled between outboard pedestal 210 and inboard pedestal 212. In the illustrated embodiment, outboard pedestal 210 is depicted as a split pillow block housing including a pillow block cap 214 and a pillow block base 216 that together provide a split diameter case to receive a bearing assembly 218 therein. Bearing assembly 218 may be a journal bearing assembly, a spherical bearing assembly or other suitable bearing assembly type. Bearing assembly 218 is coupled to pillow block cap 214 and pillow block base 216 using bolts or other suitable fasteners and provides a low friction environment for rotation of spindle gearbox 44 about conversion axis 50. In the illustrated embodiment, pillow block base 216 is integral with and forms an upper portion of an outboard tip rib extending above wing 18. Pillow block cap 214 and pillow block base 216 are coupled together using suitable fasteners depicted as a plurality of bolts 220.

In the illustrated embodiment, inboard pedestal 212 is depicted as a split pillow block housing including a pillow block cap 224 and a pillow block base 226 that together provide a split diameter case to receive a bearing assembly 228 therein. Bearing assembly 228 may be a journal bearing assembly, a spherical bearing assembly or other suitable bearing assembly type. Bearing assembly 228 is coupled to pillow block cap 224 and pillow block base 226 using bolts or other suitable fasteners and provides a low friction environment for rotation of spindle gearbox 44 about conversion axis 50. In the illustrated embodiment, pillow block base 226 is integral with and forms an upper portion of an inboard tip rib extending above wing 18. Pillow block cap 224 and pillow block base 226 are coupled together using suitable fasteners depicted as a plurality of bolts 230.

It is desirable to be able to remove pylon assembly 24a vertically relative to wing 18 for inspection, maintenance or other protocols. As best seen in FIG. 17B, pillow block cap 214 can be separated from pillow block base 216 by removing bolts 220 and by removing the bolts that couple bearing assembly 218 pillow block base 216. Likewise, pillow block cap 224 can be separated from pillow block base 226 by removing bolts 230 and by removing the bolts that couple bearing assembly 228 pillow block base 226. Pylon assembly 24a together with pillow block cap 214, bearing assembly 218, pillow block cap 224 and bearing assembly 228 may then be vertically lifted off tip ribs 216, 226. Pillow block cap 214 together with bearing assembly 218 and pillow block cap 224 together with bearing assembly 228 may then be laterally removed from spindle gearbox 44. This procedure may be reversed to install pylon assembly 24a on the tiltrotor aircraft. Pillow block cap 214 together with bearing assembly 218 and pillow block cap 224 together with bearing assembly 228 are laterally mounted to spindle gearbox 44. Thereafter, pylon assembly 24a together with pillow block cap 214, bearing assembly 218, pillow block cap 224 and bearing assembly 228 are lowered onto tip ribs 216, 226. Pillow block cap 214 can now be coupled to pillow block base 216 with bolts 220 and bearing assembly 218 can also be coupled to pillow block base 216. In addition, pillow block cap 224 can now be coupled to pillow block base 226 with bolts 230 and bearing assembly 228 can also be coupled to pillow block base 226.

In operation, outboard pedestal 210 and inboard pedestal 212 must support fore/aft loads and vertical loads generated by the proprotor assembly when the tiltrotor aircraft is cruising in airplane mode and/or operating in helicopter mode. In the illustrated embodiment, the load spectrum on bolts 220, 230 includes sheer forces and tension forces but minimal bending moments as the split lines between the pillow block caps and the pillow block bases are coincident with the centerline of spindle gearbox 44. Use of split pillow block housings in pedestals 210, 212 enables vertical removal and installation of pylon assembly 24a. In addition, the split pillow block housings including tip ribs as the pillow block bases enable stiffness tailoring of outboard pedestal 210 and inboard pedestal 212 to achieve desired dynamic modes and to maintain the output gear of fixed gearbox 36 in substantial collinear alignment with the input gear of spindle gearbox 44.

Referring next to FIGS. 18A-18B of the drawings, pylon assembly 24a is rotatably coupled between outboard pedestal 240 and inboard pedestal 242. In the illustrated embodiment, outboard pedestal 240 including a bearing cartridge 244 and a tip rib 246. Bearing cartridge 244 provides a full diameter case to receive a bearing assembly 248 therein. Bearing assembly 248 may be a journal bearing assembly, a spherical bearing assembly or other suitable bearing assembly type. Bearing assembly 248 is coupled to bearing cartridge 244 using bolts or other suitable fasteners and provides a low friction environment for rotation of spindle gearbox 44 about conversion axis 50. Bearing cartridge 244 and tip rib 246 are coupled together using suitable fasteners depicted as a plurality of bolts 250. As best seen in FIG. 18B, tip rib 246 defines a slot 252 that is designed to closely receive bearing cartridge 244 therein. In one example, tip rib 246 and bearing cartridge 244 are precision machined aluminum components having tight tolerances such that the close fitting relationship between slot 252 and bearing cartridge 244 is achieved.

In the illustrated embodiment, inboard pedestal 242 including a bearing cartridge 254 and a tip rib 256. Bearing cartridge 254 provides a full diameter case to receive a bearing assembly 258 therein. Bearing assembly 258 may be a journal bearing assembly, a spherical bearing assembly or other suitable bearing assembly type. Bearing assembly 258 is coupled to bearing cartridge 254 using bolts or other suitable fasteners and provides a low friction environment for rotation of spindle gearbox 44 about conversion axis 50. Bearing cartridge 254 and tip rib 256 are coupled together using suitable fasteners depicted as a plurality of bolts 260. As best seen in FIG. 18B, tip rib 256 defines a slot 262 that is designed to closely receive bearing cartridge 254 therein. In one example, tip rib 256 and bearing cartridge 254 are precision machined aluminum components having tight tolerances such that the close fitting relationship between slot 262 and bearing cartridge 254 is achieved.

It is desirable to be able to remove pylon assembly 24a vertically relative to wing 18 for inspection, maintenance or other protocols. As best seen in FIG. 18B, bearing cartridge 244 can be separated from tip rib 246 by removing bolts 250 and bearing cartridge 254 can be separated from tip rib 256 by removing bolts 260. Pylon assembly 24a together with bearing cartridges 244, 254 may then be vertically lifted out of tip ribs 246, 256. Bearing cartridge 244 along with bearing assembly 248 and bearing cartridge 254 along with bearing assembly 258 may then be laterally removed from spindle gearbox 44. This procedure may be reversed to install pylon assembly 24a on the tiltrotor aircraft. Bearing cartridge 244 along with bearing assembly 248 and bearing cartridge 254 along with bearing assembly 258 are laterally mounted to spindle gearbox 44. Thereafter, pylon assembly 24a together with bearing cartridges 244, 254 are lowered into slots 252, 262 of tip ribs 246, 256. Bearing cartridge 244 can now be coupled to tip rib 246 with bolts 250 and bearing cartridge 254 can now be coupled to tip rib 256 with bolts 260.

In operation, outboard pedestal 240 and inboard pedestal 242 must support fore/aft loads and vertical loads generated by the proprotor assembly when the tiltrotor aircraft is cruising in airplane mode and/or operating in helicopter mode. The primary loads on bolts 250, 260 are sheer forces in the vertical direction. Use of bearing cartridges received in tip rib slots to form outboard pedestal 240 and inboard pedestal 242 enables vertical removal and installation of pylon assembly 24a. In addition, the bearing cartridges provides a single concentric diameter for mounting the bearing assemblies therein which also enables final installation of the bearing assemblies prior to the installation of pylon assembly 24a therewith. In addition, the close fitting relationship between the bearing cartridges and the tip ribs provides a stiff coupling therebetween. Further, the use of the tip ribs to receive the bearing cartridges enables stiffness tailoring of outboard pedestal 240 and inboard pedestal 242 to achieve desired dynamic modes and to maintain the output gear of fixed gearbox 36 in substantial collinear alignment with the input gear of spindle gearbox 44.

Figure 19:
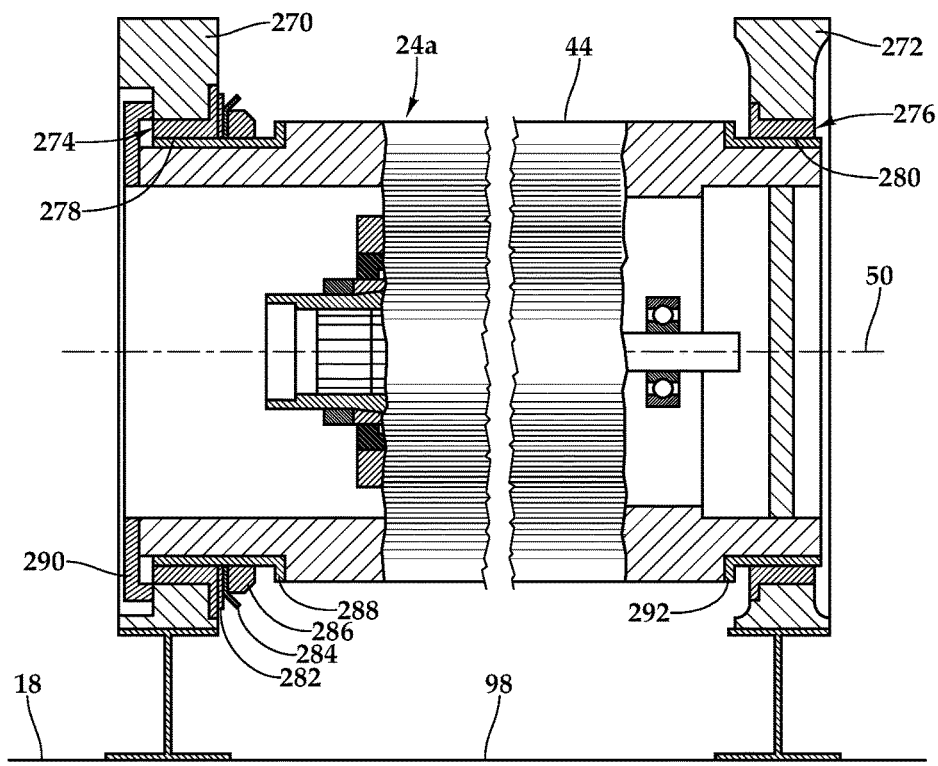
FIG. 19 is a cross sectional view of a pylon assembly positioned above a wing between inboard and outboard pedestals in accordance with embodiments of the present disclosure.

Referring next to FIG. 19 of the drawings, therein is depicted a mounting implementation for a pylon assembly above a wing of a tiltrotor aircraft. For the present discussion, only spindle gearbox 44 of pylon assembly 24a has been shown. Pylon assembly 24a is rotatably coupled between outboard pedestal 270 and inboard pedestal 272. Outboard pedestal 270 and inboard pedestal 272 may be any type of above-wing structure to which the pylon assembly is mounted including, for example, pedestals having full pillow block housings, split pillow block housings and/or bearing cartridges, as discussed herein. In the illustrated embodiment, outboard pedestal 270 includes a bearing assembly depicted as a journal bearing assembly 274 and inboard pedestal 272 includes a bearing assembly depicted as a journal bearing assembly 276. Journal bearing assembly 274 is coupled to outboard pedestal 270 and preferably has low friction contact surface 278. Likewise, journal bearing assembly 276 is coupled to inboard pedestal 272 and preferably has low friction contact surface 280. Journal bearing assemblies 274, 276 providing a stiff coupling between pylon assembly 24a and pedestals 270, 272 to control dynamic modes between pylon assembly 24a and the airframe and to maintain the output gear of fixed gearbox 36 in substantial collinear alignment with the input gear of spindle gearbox 44.

Journal bearing assembly 274 is a fixed bearing that substantially prevents lateral movement of pylon assembly 24a relative to outboard pedestal 270. In the illustrated embodiment, this is achieved using a spacer 282, a lock washer 284 and a spanner nut 286 that threadably couples with a sleeve 288 of spindle gearbox 44 to the inboard side of outboard pedestal 270. To the outboard side, a thrust washer/clamp ring 290 is coupled to spindle gearbox 44 by bolting or other suitable connection. Preferably, spacer 282 and sleeve 288 have low friction contact surfaces with journal bearing assembly 274. In addition, thrust washer/clamp ring 290 preferably has a low friction contact surface with outboard pedestal 270. Journal bearing assembly 276 is a floating bearing that allows lateral movement of pylon assembly 24a relative to inboard pedestal 272. Preferably, pylon assembly 24a includes sleeve 292 that has a low friction contact surface with journal bearing assembly 276. In operation, when spindle gearbox 44 is rotated to operate tiltrotor aircraft 10 between helicopter and airplane modes, spacer 282, lock washer 284, spanner nut 286 and thrust washer/clamp ring 290 as well as sleeve 288 and sleeve 292 rotate with spindle gearbox 44 relative to journal bearing assemblies 274, 276 and thus pedestals 270, 272.

Figure 20:
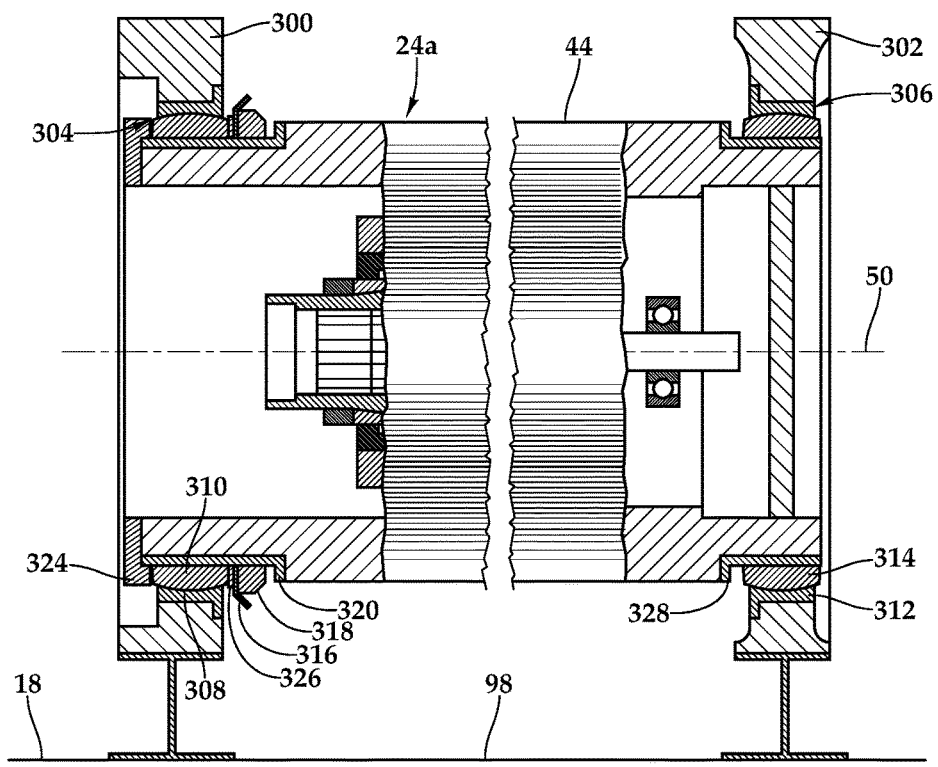
FIG. 20 is a cross sectional view of a pylon assembly positioned above a wing between inboard and outboard pedestals in accordance with embodiments of the present disclosure.

Referring next to FIG. 20 of the drawings, therein is depicted a mounting implementation for a pylon assembly above a wing of a tiltrotor aircraft. Pylon assembly 24a is rotatably coupled between outboard pedestal 300 and inboard pedestal 302, which may be any type of above-wing structure to which the pylon assembly is mounted including for example, pedestals having full pillow block housings, split pillow block housings and/or bearing cartridges as discussed herein. In the illustrated embodiment, outboard pedestal 300 includes a bearing assembly depicted as a spherical bearing assembly 304 and inboard pedestal 302 includes a bearing assembly depicted as a spherical bearing assembly 306. Spherical bearing assembly 304 includes a spherical race 308 that is coupled to outboard pedestal 300 and a monoball 310 that is rotatable relative to spherical race 308. Spherical race 308 and monoball 310 preferably have low friction contact surfaces to provide a low friction environment for relative rotation. Likewise, spherical bearing assembly 306 includes a spherical race 312 that is coupled to inboard pedestal 302 and a monoball 314 that is rotatable relative to spherical race 312. Spherical race 312 and monoball 314 preferably have low friction contact surfaces to provide a low friction environment for relative rotation. Spherical bearing assemblies 304, 306 provide a self-aligning coupling between pylon assembly 24a and pedestals 300, 302 that reduces the alignment sensitivity of pedestals 300, 302 and improves the installation repeatability of pylon assembly 24a in pedestals 300, 302. Spherical bearing assemblies 304, 306 are able to establish an axis of rotation in an environment including certain misalignment of pedestals 300, 302 and between pylon assembly 24a and pedestals 300, 302. In addition, as spherical bearing assemblies 304, 306 do not react to moments within the joint, spherical bearing assemblies 304, 306 have improved wear.

Spherical bearing assembly 304 is a fixed bearing that substantially prevents lateral movement of pylon assembly 24a relative to outboard pedestal 300. In the illustrated embodiment, this is achieved using a lock washer 316 and a spanner nut 318 that threadably couples with a sleeve 320 of spindle gearbox 44 to the inboard side of outboard pedestal 300 and a thrust washer/clamp ring 324 to the outboard side of outboard pedestal 300. An optional spacer 326 may be positioned between spherical bearing assembly 304 and lock washer 316. Spherical bearing assembly 306 is a floating bearing that allows lateral movement of pylon assembly 24a relative to inboard pedestal 302. Preferably, pylon assembly 24a includes sleeve 328 that is positioned within spherical bearing assembly 306. In operation, when spindle gearbox 44 is rotated to operate tiltrotor aircraft 10 between helicopter and airplane modes, spacer 326, lock washer 316, spanner nut 318 and thrust washer/clamp ring 324 as well as sleeve 320, monoball 310, sleeve 328 and monoball 314 rotate with spindle gearbox 44 relative to spherical races 308, 312 and thus pedestals 300, 302.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion system for a tiltrotor aircraft having a helicopter mode and an airplane mode, the tiltrotor aircraft having an airframe including a fuselage and a wing, the propulsion system comprising:
    an engine supported by the airframe proximate an outboard end of the wing;
    a fixed gearbox operably coupled to the engine and having an output gear;
    inboard and outboard pedestals supported by the airframe and positioned above the wing;
    a pylon assembly rotatably coupled between the inboard and outboard pedestals, the pylon assembly including a spindle gearbox having an input gear, a mast operably coupled to the input gear and a proprotor assembly operable to rotate with the mast, the spindle gearbox rotatable about a conversion axis to selectively operate the tiltrotor aircraft between the helicopter mode and the airplane mode; and
    a common shaft configured to transfer torque from the output gear of the fixed gearbox to the input gear of the spindle gearbox, the common shaft rotatable about the conversion axis;
    wherein, each of the inboard and outboard pedestals further comprises a pillow block housing.

2. The propulsion system as recited in claim 1 wherein each of the inboard and outboard pedestals further comprises a full pillow block housing.

3. The propulsion system as recited in claim 1 wherein each of the inboard and outboard pedestals further comprises a split pillow block housing.

4. The propulsion system as recited in claim 1 wherein the inboard pedestal further comprises a full pillow block housing and wherein the outboard pedestal further comprises a split pillow block housing.

5. The propulsion system as recited in claim 1 wherein one of the inboard and outboard pedestals further comprises a full pillow block housing and the other of the inboard and outboard pedestals further comprises a split pillow block housing.

6. The propulsion system as recited in claim 1 wherein the inboard and outboard pedestals are coupled to the airframe.

7. The propulsion system as recited in claim 6 wherein each of the inboard and outboard pedestals further comprises an intermediate support.

8. The propulsion system as recited in claim 6 wherein each of the inboard and outboard pedestals is coupled directly to the airframe.

9. The propulsion system as recited in claim 6 wherein the coupling between each of the inboard and outboard pedestals and the airframe further comprises a sheer boss.

10. The propulsion system as recited in claim 1 wherein at least a portion of the inboard and outboard pedestals is integral with the airframe.

11. The propulsion system as recited in claim 1 wherein the inboard and outboard pedestals support fore/aft loads generated by the proprotor assembly when the tiltrotor aircraft is in the airplane mode.

12. The propulsion system as recited in claim 1 wherein the inboard and outboard pedestals support vertical loads generated by the proprotor assembly when the tiltrotor aircraft is in the helicopter mode.

13. A tiltrotor aircraft having a helicopter mode and an airplane mode, the tiltrotor aircraft comprising:
    an airframe including a fuselage and a wing;

an engine supported by the airframe proximate an outboard end of the wing;

a fixed gearbox operably coupled to the engine and having an output gear;

inboard and outboard pedestals supported by the airframe and positioned above the wing;

a pylon assembly rotatably coupled between the inboard and outboard pedestals, the pylon assembly including a spindle gearbox having an input gear, a mast operably coupled to the input gear and a proprotor assembly operable to rotate with the mast, the spindle gearbox rotatable about a conversion axis to selectively operate the tiltrotor aircraft between the helicopter mode and the airplane mode; and a common shaft configured to transfer torque from the output gear of the fixed gearbox to the input gear of the spindle gearbox, the common shaft rotatable about the conversion axis;

wherein, each of the inboard and outboard pedestals further comprises a pillow block housing.

14. The tiltrotor aircraft as recited in claim 13 wherein each of the inboard and outboard pedestals further comprises a full pillow block housing.

15. The tiltrotor aircraft as recited in claim 13 wherein each of the inboard and outboard pedestals further comprises a split pillow block housing.

16. The tiltrotor aircraft as recited in claim 13 wherein the inboard pedestal further comprises a full pillow block housing and wherein the outboard pedestal further comprises a split pillow block housing.

17. The tiltrotor aircraft as recited in claim 13 wherein one of the inboard and outboard pedestals further comprises a full pillow block housing and the other of the inboard and outboard pedestals further comprises a split pillow block housing.

18. The tiltrotor aircraft as recited in claim 13 wherein the inboard and outboard pedestals are coupled to the airframe.

19. The tiltrotor aircraft as recited in claim 13 wherein at least a portion of the inboard and outboard pedestals is integral with the airframe.

20. The tiltrotor aircraft as recited in claim 13 wherein the inboard and outboard pedestals support fore/aft loads generated by the proprotor assembly when the tiltrotor aircraft is in the airplane mode and wherein the inboard and outboard pedestals support vertical loads generated by the proprotor assembly when the tiltrotor aircraft is in the helicopter mode.

* * * * *